United States Patent [19]

Rhee

[11] Patent Number: 5,081,789

[45] Date of Patent: Jan. 21, 1992

[54] FLY CATCHER DEVICE AND METHOD

[76] Inventor: Yong S. Rhee, 251-1 Soo Yoo 2nd Dong, Dohbong-ku, Seoul, Rep. of Korea

[21] Appl. No.: 607,729

[22] Filed: Nov. 1, 1990

[51] Int. Cl.⁵ .............................................. A01M 3/00
[52] U.S. Cl. .................................... 43/134; 43/135
[58] Field of Search ................... 43/134, 135, 136, 137, 43/12

[56] References Cited

U.S. PATENT DOCUMENTS

| | | | |
|---|---|---|---|
| 115,374 | 5/1871 | Sohier | 43/134 |
| 132,733 | 11/1872 | Olson | 43/134 |
| 210,163 | 11/1878 | Steinmetz | 43/134 |
| 2,457,922 | 1/1949 | Robinson | 43/12 |
| 3,996,690 | 12/1976 | Ridings | 43/134 |
| 4,492,052 | 1/1985 | Davis | 43/12 |
| 4,530,178 | 7/1985 | Rauscher | 43/26 |
| 4,594,808 | 6/1986 | Rhee | 43/134 |

FOREIGN PATENT DOCUMENTS

| | | |
|---|---|---|
| 0544183 | of 1922 | France ................... 43/134 |
| 53-107575 | 8/1978 | Japan . |
| 55-58045 | 4/1980 | Japan . |
| 35954 | 7/1935 | New Zealand . |
| 217868 | 3/1924 | United Kingdom . |

*Primary Examiner*—Richard K. Seidel
*Assistant Examiner*—Chuck Y. Mah
*Attorney, Agent, or Firm*—Fisher, Christen & Sabol

[57] ABSTRACT

A fly catcher device, which includes tong means which has two rigid arm segments pivotally joined on one end so as to normally be in an open position. The tong means is capable of being manually closed so that the two rigid arm segments are moved into contact with each other. The fly catcher device also includes two rigid arms. Each of the rigid arms are affixed in a removable manner to the other end of one of the rigid arm segments of the tong means. The fly catcher device further includes flexible bag means having an opening in one periphery portion thereof. Opposite sides of the bag means in the opening region thereof are affixed to the two rigid arm segments.

13 Claims, 5 Drawing Sheets

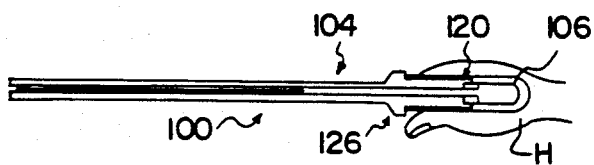
FIG. 10
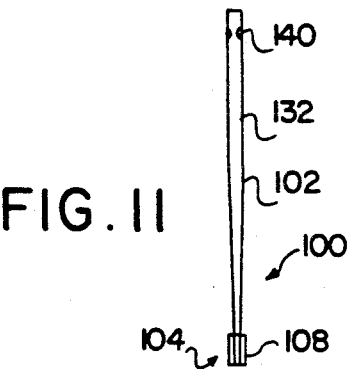
FIG. 11
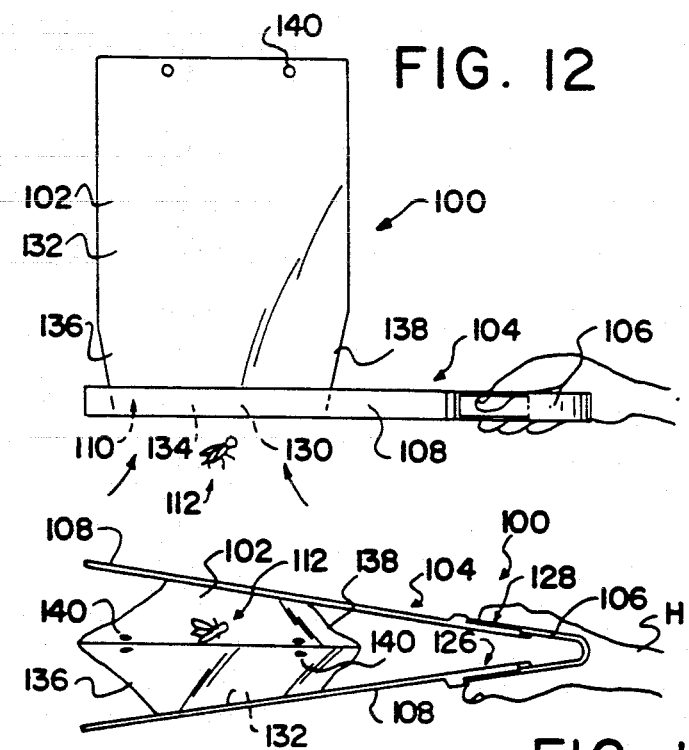
FIG. 12
FIG. 14
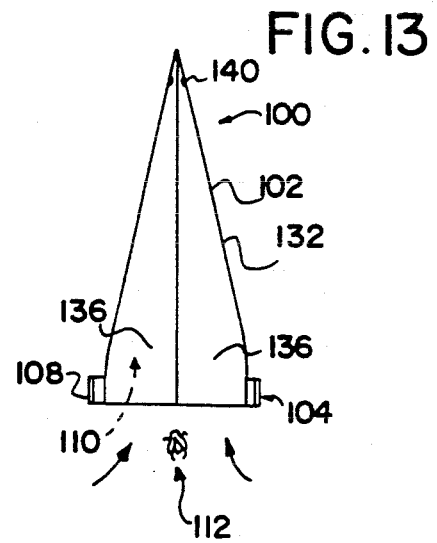
FIG. 13

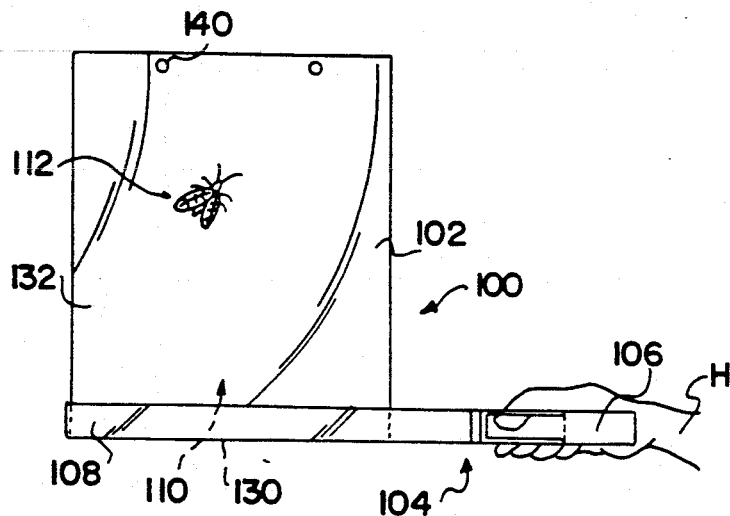
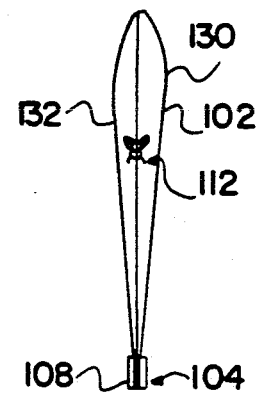
FIG. 15  FIG. 16
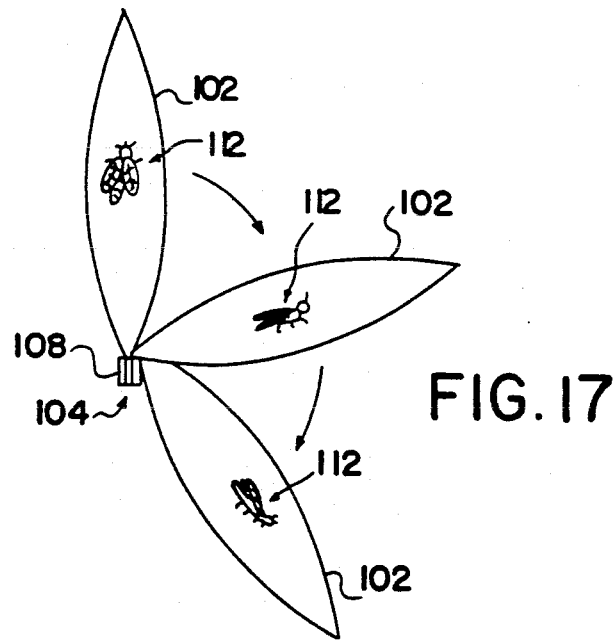
FIG. 17

FLY CATCHER DEVICE AND METHOD

BACKGROUND OF THE INVENTION

1. Field of the Invention

The invention relates to devices for catching flies or other flying insects in a sanitary way, and then kills or allows the killing of the insects without using chemical sprays, fly swatters or fly catchers.

2. Background Art

The use of fly swatters to exterminate insects is well-known. In particular, a fly swatter includes a screen-like material to permit passage of air, which is necessary since household flies and other insects are highly sensitive to air pressure variations and could easily escape before being swatted. Thus, due to the reduction of air pressure provided by the holes of a screen-like material of a fly swatter, the fly has insufficient time to escape to avoid being swatted. However, the swatting process is highly unsanitary, and spreads the remains of the insect across the solid surface on which the fly had been resting. In the case where the fly is resting upon utensils used for handling food, or upon kitchen or table surfaces where food is handled, the use of a fly swatter is unsanitary and should be avoided, since insects can carry in their blood and body parts infectious and contagious diseases.

Chemical sprays are useful in killing flying insects, and are generally most effective when sprayed directly upon the insect. However, where the insects are in a kitchen, a table for food or on food itself, the use of sprays is inadvisable since chemical sprays are usually poisonous to human beings as well as to insects. Such chemical sprays are commonly found as aerosol sprays, and cannot be readily used where a fly or flying insect is resting upon a surface, such as, food, tableware, kitchen utensils or the like, which should not be sprayed with a poisonous substance, such as, insect spray.

Also well-known in the art are fly traps including devices such as sticky fly paper having a fly-attracting scent. Other types of fly-trapping devices include an ultraviolet light sources surrounded by electrified wires to shock and/or incinerate insects approaching the ultraviolet light source. While this means is generally sanitary, it is not selectively effective upon a particular fly. In such a situation, a particular fly may not be attracted to the sticky fly paper or the ultraviolet light source. Furthermore, fly paper is not reusable. Also, use of the ultraviolet light source and electrified wires is generally much more expensive and is cumbersome. The devices containing the ultraviolet source and electrified wires are generally not readily portable since they require the electrical power source.

Butterfly nets are designed so as to capture specimens in the field without damaging them.

U.S. Pat. No. 115,374 discloses a house-fly net which has a long and conical shape, with a flattened side, and a wire hoop at the top attached to a handle socket.

U.S. Pat. No. 132,733 discloses a fly-catcher which has a net hung on a hoop. Tongs, hung on a pivot, is closed by cords whereby the opening to the net is closed.

U.S. Pat. No. 4,530,178 discloses a transparent holder for guns, fishing rods and the like, which is formed from a single sheet of resilient, flexible, transparent material. The material is cut into an elongated, symmetrical, quadrilateral shape. The material is folded about its axis of symmetry, forming a top edge, an elongated side edge, and a shorter bottom edge. The elongated side edges are placed over one another and sewn together along the entire length; similarly, the bottom edges which overlap are sewn together along their entire length. A first strip having a hook-and-eye type fastener structure is attached to the sheet portion at a point somewhat below the top edge and located at the center of the sheet, and its sewn into place along its edges with the gripping side of the strip exposed. A second hook-and-eye type fastener strip, of identical width, is attached to the top of the underlying sheet at its center with a portion of the strip exposed. Upon insertion of an object into a pocket formed between the sheets, the casing may be closed by folding the top portion over at a point above the fist strip toward the facing sheet, so that the strips abut. The thread used is ultraviolet resistant thread, so that is resists rotting. An eyelet is inserted at the bottom of the holder through the two sheets so that in storage, the holder with the article retained within may be hung from the bottom eyelet by a nail.

British Patent No. 217,868 discloses a flytrap constructed from one or more sheets of material sealed along some of their edges so that the flytrap has an open mouth at one end and is closed at the other end, having the form of a cone or a hollow pyramid. The pyramidal form of the flytrap is capable of being collapsed by folding its edges together.

New Zealand Patent No. 35,954 discloses the use of transparent material in flycatchers.

Attention is also drawn to Japanese Published Utility Patent Application No. 53-107575 and Japanese Published Patent Application No. 55-58045.

U.S. Pat. No. 4,594,808 discloses a light-weight, transparent, elongated enclosure for catching flys. The enclosure is generally in the shape of a trapezoidal member, has an opening at a bottom end and at a top end. The transparent material is resiliently deformable. Two generally planar sheets of material are used, and are in overlying relationship, and are fastened together along opposed edges thereof. Squeezing together of the longest sides of the trapezoidal member by manual operation results in deformation of the two overlying sheets away from each other. This results in a continuous opening from a large side of the trapezoid at the bottom through to a top short, side of the trapezoid at the top. In operation, the fly catcher is squeezed manually to provide an opening as described above, and is then positioned above the fly to be caught. The fly, sensing the pressure due to movement of the descending fly catcher, flies upwardly and into the cone-shaped opening formed by the fly catcher. Pressure is then immediately released, and the sheets returned to their normal, generally planar state thus trapping the fly between the two sheets of transparent material. The fly can be exterminated by pressure if necessary. The remains of the fly are removed merely by repeating the manual squeezing operation on the sides of the fly catcher, permitting the remains to fall out of the enclosure. In practical use, a beginner needs some practice before he can easily and proficiently use the fly catcher. Also, the fly catcher is difficult for young children to use. The manufacturing cost of the fly catcher is higher than originally projected.

BROAD DESCRIPTION OF THE INVENTION

One object of the invention is to provide an improved fly catcher which in inexpensive to fabricate, requires no complex equipment or expensive materials in the fabrication thereof, and can be manufactured by persons of common skills. Another object of the invention is to provide a sanitary fly catcher for selectively catching an individual fly without swatting or destroying the fly at the location where the fly is to be caught. Another object of the invention is to provide a manually operable improved fly catcher which is resuable and portable, and which is effective in trapping flies. A further object of the invention is to provide a fly catcher which has a replaceable fly catcher enclosure. Other objects and advantages of the invention are set out herein or are obvious herefrom to one skilled in the art.

The objects and advantages of the invention are achieved by the device and methods of the invention.

The invention involves a fly catcher device, which includes tong means which has two rigid arm segments pivotally joined on one end so as to normally be in an open position. The tong means is capable of being manually closed so that the two rigid arm segments are moved into contact with each other. The fly catcher device also includes two rigid arms. Each of the rigid arms are affixed in a removable manner to the other end of one of the rigid arm segments of the tong means. The fly catcher device further includes flexible bag means having an opening in one periphery portion thereof. Opposite sides of the bag means in the opening region thereof are affixed to the two rigid arm segments.

Preferably the two rigid arms are transparent and the flexible bag means is transparent. Preferably the bag means is composed of two substantially-equal trapezoidal sheets which are joined together at the edge on three sides, the unjoined edges of the side forming the opening in the bag means, and each of the rigid arms being affixed to only the middle portion of the edge of the side of the bag means forming the opening, so that the opening has a generally rectangular or trapezoidal cross-section when the tong means is in the open position. Preferably the other end of each of the rigid arm segment removably fits into a slot in one end of one of the rigid arms in a manner which allows the tong means to be manually closed.

The invention also includes a method of trapping a flying insect. The method includes the steps of:

(A) positioning the flexible bag means of the fly catcher device of claim 1, in the open position, above the flying insect to be trapped;

(B) move the flexible bag means of the fly catcher device, in the open position, downwards towards the flying insect, which flys upward into the flexible bag means; and (C) manually forcing the rigid arm segments of the tong together, thereby closing the opening of the flexible bag means, the flying insect trapped therein.

Preferably the flexible bag means is transparent and the two rigid arms are transparent. Preferably the flying insect is located on a surface before step (A) is initiated. Preferably the flexible bag means, containing the flying insect trapped therein, and the associated two rigid arms are removed from the tong means, and are replaced with another flexible bag means and associated two rigid arms.

The invention further includes a method of exterminating a flying insect. The method includes the steps of:

(A) positioning the flexible bag means of the fly catcher device of claim 1, in the open position, above the flying insect to be trapped;

(B) moving the flexible bag means of the fly catcher device, in the open position, downwards towards the flying insect, which flys upward into the flexible bag means;

(C) manually forcing the rigid arm segments of the tong together, thereby closing the opening of the flexible bag means, the flying insect trapped therein; and (D) applying a force to the portion of the flexible bag means, wherein the flying insect is located, sufficient to exterminate the flying insect.

Preferably the flexible bag means is transparent and the two rigid arms are transparent. Preferably the flying insect is located on a surface before step (A) is initiated. Preferably the flexible bag means, containing the flying insect trapped therein, and the associated two rigid arms are removed from the tong means, and are replaced with another flexible bag means and associated two rigid arms.

Further details and advantages of the invention appear in the following description of the preferred embodiment shown schematically in the drawings.

BRIEF DESCRIPTION OF THE DRAWINGS

In the drawings:

FIG. 10 is a top elevational view of the improved fly catcher device of FIG. 8 in the closed position;

FIG. 11 is a front elevational view of the improved fly catcher device of FIG. 8 in the closed position;

FIG. 12 is a side elevational view of the improved fly catcher device of FIG. 8 in the open position, illustrating the capturing of a fly;

FIG. 13 is a front elevational view of the improved fly catcher device FIG. 8 in the open position, illustrating the capturing of a fly;

FIG. 14 is a top elevational view of the improved fly catcher device of FIG. 8, in the open position, illustrating the capturing of a fly;

FIG. 15 is a side elevational view of the improved fly catcher device of FIG. 8 in the closed position, illustrating a captured fly;

FIG. 16 is a front elevational view of the improved fly catcher device of FIG. 8, in the closed position, illustrating a captured fly.

FIG. 17 is a front elevational view of the improved fly catcher device of FIG. 8 in the closed position, illustrating the modes after a fly is captured; and

DETAILED DESCRIPTION OF THE INVENTION

Figure 1:
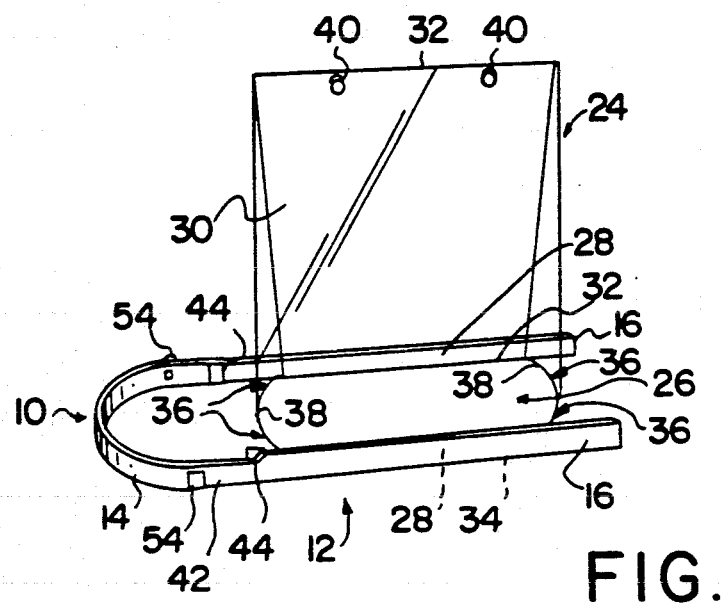
FIG. 1 is a side view of the most preferred embodiment of the improved fly catcher device of the invention in the open position.
Figure 7:
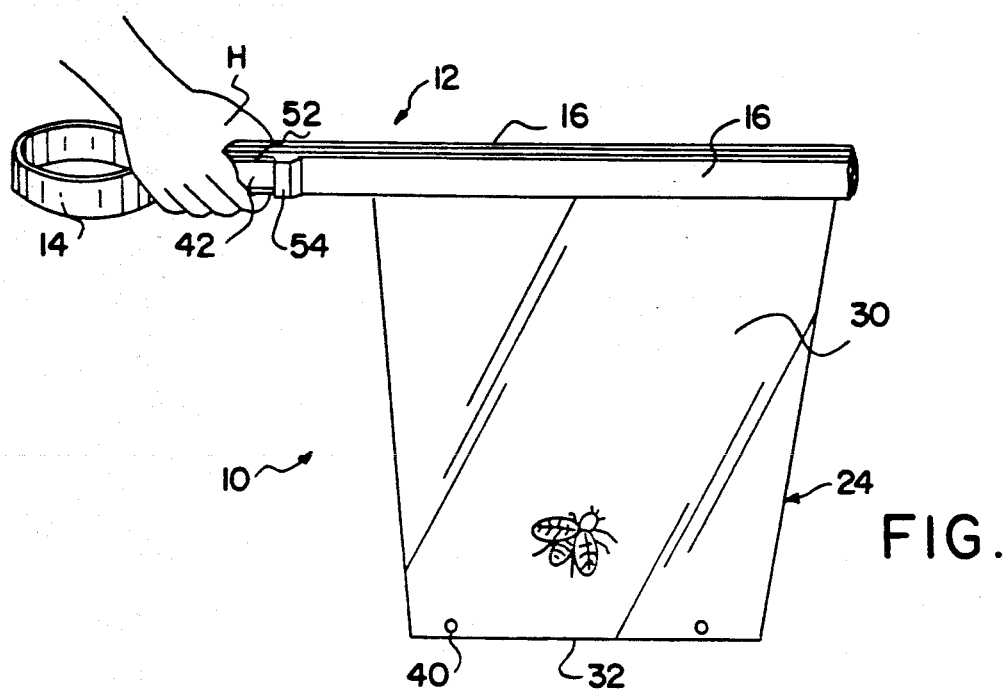
FIG. 7 is a front elevational view of the improved fly catcher device of FIG. 1, in the closed position, illustrating a captured fly, with the capture bag in the fallen position.

Referring to FIG. 1, the preferred embodiment of improved fly catcher 10 is shown. Tong 12 has curved base 14 and two arms 16. Curved base 14 and arms 16 are composed of transparent materials, preferably transparent plastic. End mounting 18 of each elongated arm 16 is removably mountable in one of the end mountings 22 of curved base 14. Arms 16 are preferably rigid, which has the advantages discussed below. Also, arms 16 have a shape which allows them to contact each other along at least all but their end extremities. Curved base 14 preferably is U-shaped so that elongated arms 16 are parallel when improved fly catcher 10 is in its open position. Curved base 14 is composed of a flexible, resilient material at least in the curved portion thereof. Curved base 14 has a wide curve which allows closure manually as shown in FIG. 7.

Bag 24 has opening 26. The opposing outer end portions 28 of bag 24 near opening 26 are affixed (by any suitable means, such as, gluing or other adhesive or heat fusing) to the inside surface of the middle portion of elongated arms 16. Bag 24, when in its closed position, has two side segments 30 which are in opposing location and are trapezoidal in shape. The top edge 32 of each side segment 30 is shorter than the bottom edge 34 thereof. As only the middle portion of each bottom edge 34 is affixed to the middle portion of one of arms 16, arms 16 can be in relationship to each other where they are apart by the distance d formed by the non-affixed portions of bottom edges 36. The non-affixed end portions of side segments 30 are labelled 38.

Bag 24 preferably has one, two or more holes 40 in the top (closed) region of each side segment 24. Opposing holes 40 are usually on the same center lines due to ease of manufacture. Holes 40 allow the escape of some air from bag 24 when the bottom of bag 30 is closed.

Figure 2:
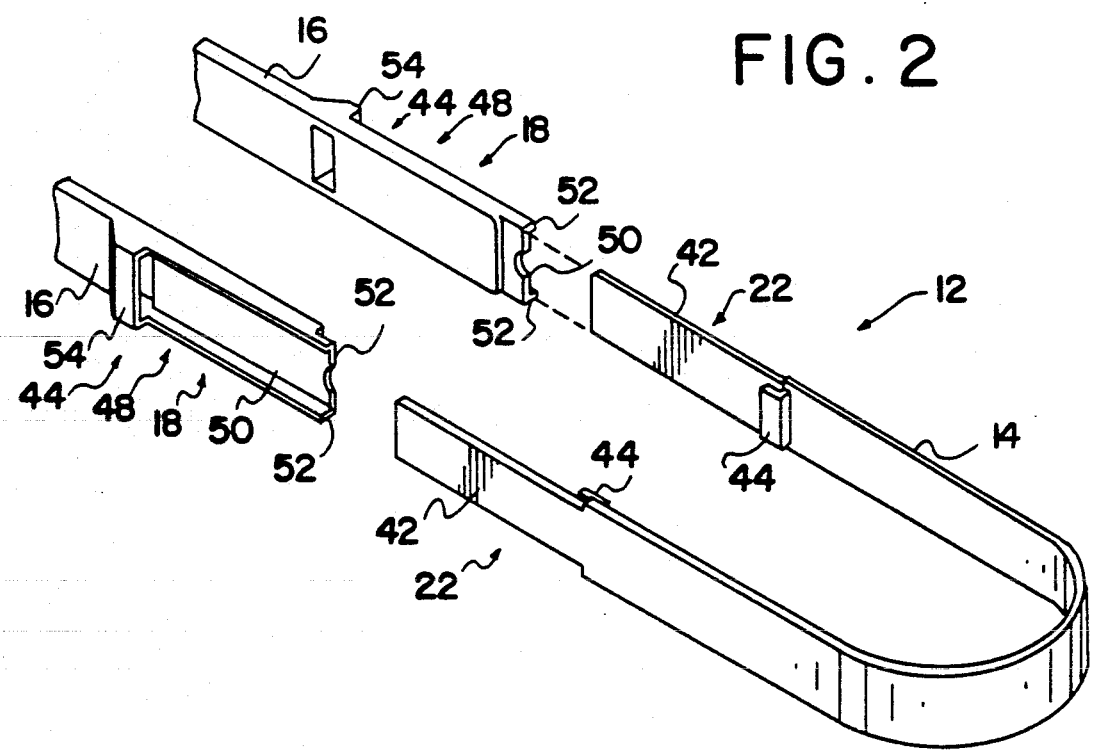
FIG. 2 is a perspective, exploded view of the tong and the replaceable, bottom, transparent sticks of the improved fly catcher device of the invention in the open position.
Figure 3:
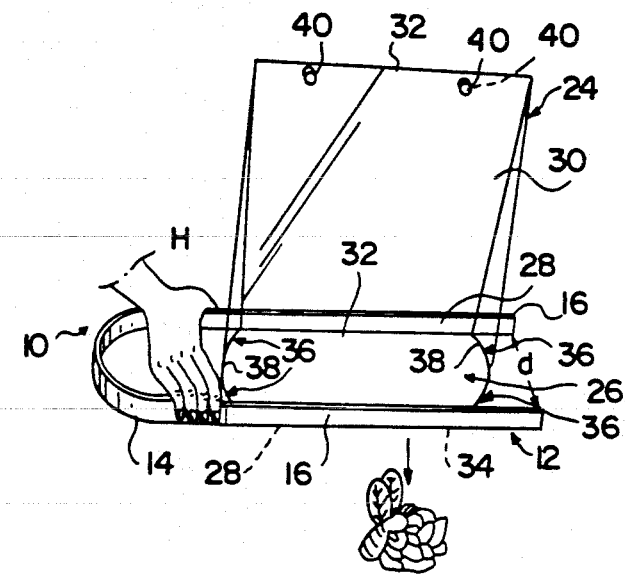
FIG. 3 is a side perspective view of the improved fly catcher device of FIG. 1 in the fly catching mode.
Figure 4:
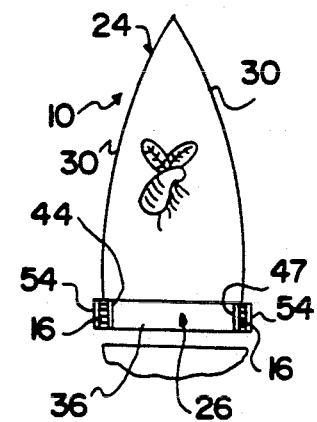
FIG. 4 is a front elevational view of the improved fly catcher device of FIG. 1 in the open position, illustrating the capturing of a fly.
Figure 5:
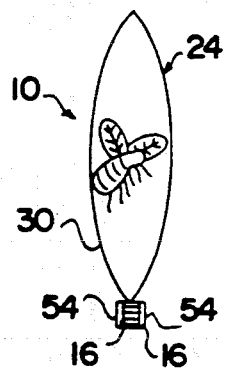
FIG. 5 is a side elevational view of the improved fly catcher device of FIG. 1 in the closed position, illustrating a captured fly.
Figure 6:
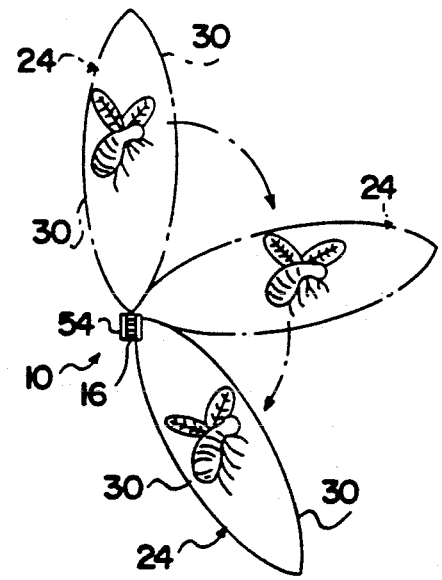
FIG. 6 is a front elevational view of the improved fly catcher device FIG. 1 in the closed position, illustrating the modes after a fly is captured.

End portion 42 of each arm 16 of tong 12 is slightly smaller in height than the rest of arm 1.. See FIG. 2. End portion 42 inwardly termintes in L-shaped stop 44. The inwards end 44 of each rigid arm 16 has mounting means 48 in which end portions 42 of arms 16 are detachably mounted. Mounting means 48 includes slide 50 with L-shaped sides 52 and L-shaped stop 54.

FIGS. 3 to 7 illustrate the capture of a fly.

Once captured, a fly can be killed or released into the atmosphere, as desired.

Curved base 14 is preferably formed of a transparent material such as a transparent plastic. While a resilient, flexible PVC is preferred, any other resilient deformable flexible transparent material can be used. Broadly, any material, whether flexible or not, which is resiliently deformable, can be used. When hand H manually squeezes curved base 14, arms 16 are brought together and opening 26 completely closed. The non-open end of curved base 14 is in the form of a circle or the like.

Arms 16 is also preferably formed of a transparent material such as a transparent plastic. Any material, whether transparent or not, which is sufficiently rigid, can be used. The bottom regions of bag 24 can be affixed to arms 16 in any desired manner, such as, chemically bonding where they are in contact with one another. This may be done by using, for example, a thermal adhesive, pressure sensitive adhesive, animal glue, or the like. Also, the bond may be formed by use of ultrasonic welding, heat welding, or the like, depending upon the properties of the material. Furthermore, the affixing can alternatively be formed by the use of commonly available plastic adhesive tape having a pressure-adhesive-coated side. Furthermore, although the affixing is generally a continuous region, such need not be the case. Rather, the adhering together can be discontinuously fastened as by dots, small patches of adhesive tape, small patches of adhesive glue or ultrasonic welding. Furthermore, patterns of attachment can be formed as well.

Bag 24 is preferably formed of a relatively-thin transparent material such as a transparent plastic. The wall thickness should normally be thick enough to allow the bag to support itself when mouth 26 is open. Any material, whether transparent or not which meets such criterion, can be used.

While a trapezoidal shape is shown in the present invention, any generally trapezoidal shape even one approaching that of a rectangular or square shape, can be used if so desired. However, the trapezoidal shape shown in the preferred embodiments of the present invention have the advantage of being economical in the use of material, and of providing a large opening at the bottom for receiving a fly. The use of transparent material in the present invention also facilitates the fly trapping function, since this generally prevents the fly from visually detecting the presence of the assembly until the assembly has been properly positioned and is moving downwardly.

The use of rigid tong arms allow the closure of the entire end of the bag and the maintaining of that closure by manual pressure or force via the closure of the curved or pivotal portion of the tong.

In practical use, a beginner can easily and proficiently use the fly catcher. Also, the fly catcher is easy for young children to use. The manufacturing cost of the fly catcher is believed to be relatively low.

Figure 8:
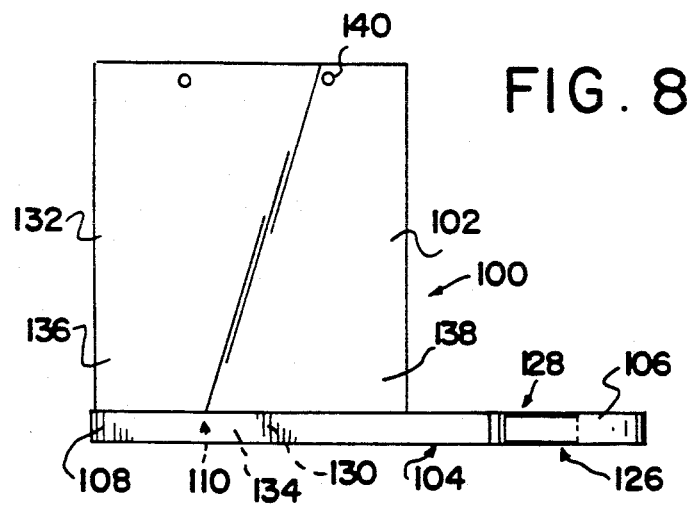
FIG. 8 is a side elevational view of another embodiment of the improved fly catcher device of the invention in the closed position.

Referring to FIG. 8, another embodiment of improved fly catcher (100) is shown. Tong 104 has curved base 106 and two arms 108. Curved base 106 and arms 108 are composed of transparent material, preferably transparent plastic. End mounting 126 of each elongated arm 108 is removably mountable in one of the end mounting 128 of curved base 106. Arms 108 are preferably rigid. Also, arms 108 have a shape which allows them to contact each other along at least all but their end extremities. Curved base 106 usually is shaped so that elongated arms 108 are not parallel when improved fly catcher 100 is in its open position. Curved base 106 is composed of a flexible, resilient material at least in the curved portion thereof. Curved base 106 allows closure manually as shown in FIG. 10.

Bag 102 has opening 110. The opposing outer end portions 130 of bag 102 near opening 110 are affixed (by any suitable means, such as, gluing or other adhesive or heat fusing) to the inside surface of the middle portion of elongated arms 108. Bag 102, when in its closed position, has two side segments 132 which are in opposing location. Each side segment 132 is preferably rectangular, but can be trapezoidal. As only the middle portion o each bottom edge 134 is affixed to the middle portion of one of arms 108, arms 108 can be in relationship to each other where they are apart from each other. The inner and outer non-affixed end portions of side segments 132 are labelled 136 and 138, respectively. See FIG. 14.

Bag 102 preferably has one, two or more holes 140 in the top (closed) region of each side segment 132. Opposing holes 140 are usually on the same center lines due to ease of manufacture. Holes 140 allow the escape of some air from bag 102 when the bottom of bag 102 is closed.

Figure 9:
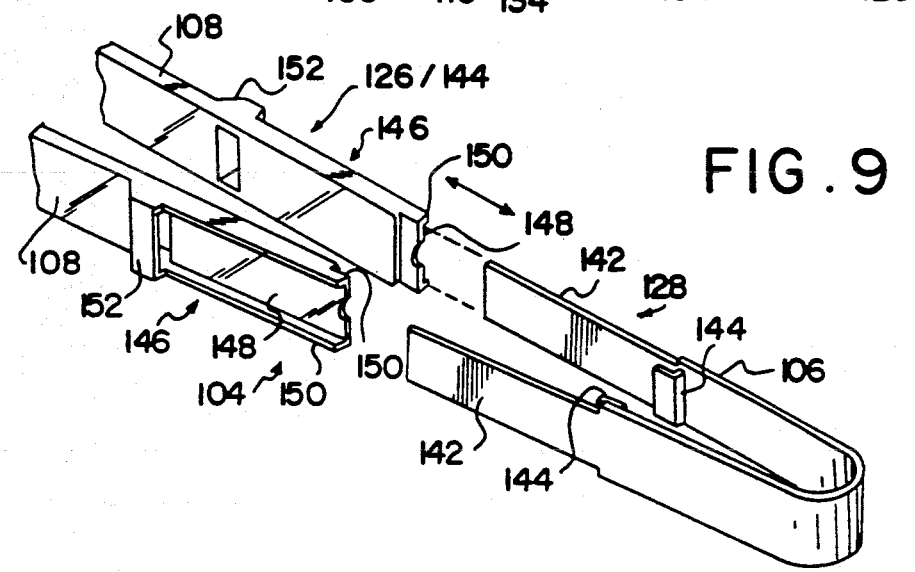
FIG. 9 is a perspective, exploded view of the tong and the replaceable, bottom, transparent sticks of the improved fly catcher device of FIG. 8 in the open position.

End portion 142 of each arm 108 of tong 104 is slightly smaller in height than the rest of arm 108. See FIG. 9. End portion 142 inwardly terminates in L-shaped stop 144. The inwards end 144 of each rigid arm 108 has mounting means 146 in which end portions 142 of arms 108 are detachably mounted. Mounting means 146 includes slide 148 with L-shaped sides 150 and L-shaped stop 152.

FIGS. 12 to 17 illustrate the capture of a fly.

The invention fly catcher device is inexpensive to fabricate, requires no complex equipment or expensive materials in the fabrication thereof, and can be manufactured by persons of common skills. The invention fly catcher device provides sanitary means for selectively catching an individual fly without swatting or destroying at the location where the fly is to be caught. The invention fly catcher device is reusable and portable, and is effective in trapping flies. The invention fly catcher device has a replaceable fly catcher enclosure.

The improved fly catcher of the invention is capable of achieving the above-enumerated objects, and while the preferred embodiments of the invention have been disclosed, it will be understood that it is not limited thereto but may be otherwise embodied within the scope of the following claims.

What is claimed is:

1. Fly catcher device comprising:
   (a) tong means which has two rigid arm segments flexibly or pivotally joined on one end so as to normally be in an open position, said tong means being capable of being manually closed so that the two rigid arm segments are moved into contact with each other;
   (b) two rigid arms, each of the rigid arms being affixed in a removable manner to the other end of one of the rigid arm segments of the tong means;
   (c) flexible bag means having a generally rectangular or trapezoidally-shaped opening in one periphery portion thereof, the opposite sides of the bag means in the opening region thereof being affixed to the two rigid arm segments.

2. The fly catcher device as claimed in claim 1 wherein the two rigid arms are transparent.

3. The fly catcher device as claimed in claim 2 wherein said bag means comprises two substantially-equal sized trapezoidal sheets, the edges of said sheets being joined together on three sides, the edges of said unjoined fourth sides of said sheets forming the opening in the bag means, and each of said rigid arms being affixed to only the middle portion of the edges of said unjoined fourth sides of said sheets, so that the opening has a generally rectangular or trapezoidal cross-section when the tong means is in the open position.

4. The fly catcher device as claimed in claim 1 wherein the flexible bag means is transparent.

5. The fly catcher device as claimed in claim 1 wherein the other end of each of the rigid arm segment removably fits into a slot in one end of one of the rigid arms in a manner which allows the tong means to be manually closed.

6. Method of trapping a flying insect, comprising the steps of:
   (A) providing the fly catcher device of claim 1, positioning the flexible bag means in an open position, above the flying insect to be trapped;
   (B) moving the flexible bag means of the fly catcher device, in the open position, downwards towards the flying insect, which flies upward into the flexible bag means; and
   (C) manually forcing the rigid arm segments of the tong together, thereby closing the opening of the flexible bag means, the flying insect being trapped therein.

7. The method as claimed in claim 6 wherein the flexible bag means is transparent and the two rigid arms are transparent.

8. The method as claimed in claim 6 wherein the flying insect is located on a surface before step (A) is initiated.

9. The method as claimed in claim 6 wherein the flexible bag means, containing the flying insect trapped therein, and the associated two rigid arms are removed from the tong means, and are replaced with another flexible bag means and associated two rigid arms.

10. Method of exterminating a flying insect, comprising the steps of:
    (A) providing the fly catcher device of claim 1, positioning the flexible bag means in an open position, above the flying insect to be trapped;
    (B) moving the flexible bag means of the fly catcher device, in the open position, downwards toward the flying insect, which flies upward into the flexible bag means;
    (C) manually forcing the rigid arm segments of the tong together, thereby closing the opening of the flexible bag means, the flying insect being trapped therein; and
    (D) applying a force to the portion of the flexible bag means, wherein the flying insect is located, sufficient to exterminate the flying insect.

11. The method as claimed in claim 10 wherein the flexible bag means is transparent and the two rigid arms are transparent.

12. The method as claimed in claim 10 wherein the flying insect is located on a surface before step (A) is initiated.

13. The method as claimed in claim 10 wherein the flexible bag means, containing the flying insect trapped therein, and the associated two rigid arms are removed from the tong means, and are replaced with another flexible bag means and associated two rigid arms.

* * * * *